US007329960B1

(12) United States Patent
Kumar

(10) Patent No.: US 7,329,960 B1
(45) Date of Patent: Feb. 12, 2008

(54) SYSTEM AND METHOD FOR PROPELLING A LARGE LAND-BASED VEHICLE USING A DUAL FUNCTION BRUSHLESS DYNAMOELECTRIC MACHINE

(75) Inventor: Ajith K. Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 11/460,111

(22) Filed: Jul. 26, 2006

(51) Int. Cl.
  *F02D 29/06* (2006.01)
  *H02P 9/04* (2006.01)
  *H02P 11/00* (2006.01)
(52) U.S. Cl. ..................................... 290/40 C; 322/16
(58) Field of Classification Search ............. 290/40 C; 322/16
  See application file for complete search history.

(56) References Cited

U.S. PATENT DOCUMENTS

| | | | | |
|---|---|---|---|---|
| 3,937,974 | A | | 2/1976 | Lafuze .......................... 290/46 |
| 4,244,023 | A | * | 1/1981 | Johnson ....................... 701/110 |
| 4,269,280 | A | * | 5/1981 | Rosen ......................... 180/69.6 |
| 4,292,531 | A | | 9/1981 | Williamson ................... 290/14 |
| 4,319,140 | A | * | 3/1982 | Paschke ........................ 290/45 |
| 4,616,166 | A | | 10/1986 | Cooper et al. ............... 318/712 |
| 4,629,947 | A | * | 12/1986 | Hammerslag et al. ....... 318/161 |

(Continued)

*Primary Examiner*—Julio Gonzalez
*Assistant Examiner*—Pedro J. Cuevas
(74) *Attorney, Agent, or Firm*—Carlos Hanze, Esq.; Enrique J. Mora, Esq.; Beusse Wolter Sanks Mora & Maire, P.A.

(57) ABSTRACT

A propulsion system for a relatively large land-based vehicle, such as a locomotive or off-highway vehicle, is provided. The system may include a brushless dynamoelectric machine made up of a main alternator having a main rotor and a main stator, and an auxiliary alternator having an auxiliary rotor and an auxiliary stator, wherein the main rotor and the auxiliary rotor are disposed on a shaft for joint rotation with the shaft. The dynamoelectric machine is operable in a power generating mode, and in an engine cranking mode. A power source may be connected to pass current to one or more windings in the auxiliary stator to induce an alternating current flow in one or more windings in the auxiliary rotor. A rectifier may be connected to receive the alternating current flow from the one or more windings in the auxiliary rotor. The rectifier is further connected to supply a rectified current to one or more windings in the main rotor to induce an alternating current flow in one or more windings in the main stator of the machine, wherein the alternating current flow in the one or more windings in the main stator of the machine constitutes the current generated by the dynamoelectric machine during the power generating mode. The power source to be connected during the engine cranking mode may be first and second inverters connected to provide an AC conversion to a DC input from an energy storage device to supply a respective alternating current having some desired characteristics. The one inverter may be connected to the one or more windings in the main stator, and the other inverter may be connected to the one or more windings in the auxiliary stator to produce a torque in the main rotor of the machine. The torque produced at the main rotor of the machine is mechanically coupled to a crankshaft of an internal combustion engine of the propulsion system to start the engine during the engine cranking mode.

18 Claims, 3 Drawing Sheets

U.S. PATENT DOCUMENTS

| | | | | |
|---|---|---|---|---|
| 4,653,601 A * | 3/1987 | Nakamura et al. | ......... | 180/446 |
| 4,745,315 A | 5/1988 | Terry, Jr. et al. | ......... | 310/68 D |
| 4,753,078 A * | 6/1988 | Gardner, Jr. | ......... | 60/668 |
| 4,939,441 A | 7/1990 | Dhyanchand | ......... | 318/718 |
| 4,951,769 A * | 8/1990 | Kawamura | ......... | 180/65.4 |
| 4,953,646 A * | 9/1990 | Kim | ......... | 180/65.4 |
| 4,973,896 A * | 11/1990 | Shiga et al. | ......... | 322/28 |
| 4,994,684 A | 2/1991 | Lauw et al. | ......... | 290/52 |
| 5,028,804 A * | 7/1991 | Lauw | ......... | 290/40 C |
| 5,083,077 A * | 1/1992 | Wallace et al. | ......... | 322/32 |
| 5,239,251 A * | 8/1993 | Lauw | ......... | 318/767 |
| 5,321,308 A * | 6/1994 | Johncock | ......... | 290/40 C |
| 5,384,521 A * | 1/1995 | Coe | ......... | 318/161 |
| 5,568,023 A * | 10/1996 | Grayer et al. | ......... | 318/139 |
| 5,614,768 A * | 3/1997 | Tanaka | ......... | 290/40 C |
| 5,635,768 A * | 6/1997 | Birch et al. | ......... | 290/40 C |
| 5,635,805 A * | 6/1997 | Ibaraki et al. | ......... | 318/139 |
| 5,650,713 A * | 7/1997 | Takeuchi et al. | ......... | 322/16 |
| 5,689,174 A * | 11/1997 | Pacheco, Sr. | ......... | 322/16 |
| 5,691,625 A | 11/1997 | Kumar et al. | ......... | 322/20 |
| 5,698,905 A * | 12/1997 | Ruthlein et al. | ......... | 290/32 |
| 5,786,640 A * | 7/1998 | Sakai et al. | ......... | 290/17 |
| 5,966,000 A * | 10/1999 | Yang | ......... | 322/23 |
| 6,023,137 A * | 2/2000 | Kumar et al. | ......... | 318/254 |
| 6,054,844 A * | 4/2000 | Frank | ......... | 322/16 |
| 6,369,532 B2 * | 4/2002 | Koenen et al. | ......... | 318/150 |
| 6,394,210 B2 * | 5/2002 | Matsuda et al. | ......... | 180/68.1 |
| 6,483,218 B1 | 11/2002 | Petrinko | ......... | 310/112 |
| 6,486,568 B1 * | 11/2002 | King et al. | ......... | 307/66 |
| 6,534,958 B1 * | 3/2003 | Graber et al. | ......... | 322/11 |
| 6,661,109 B2 * | 12/2003 | Fukasaku et al. | ......... | 290/40 C |
| 6,707,169 B2 * | 3/2004 | Shimizu et al. | ......... | 290/40 C |
| 6,801,019 B2 * | 10/2004 | Haydock et al. | ......... | 322/17 |
| 6,819,007 B2 * | 11/2004 | Fukaya | ......... | 290/40 C |
| 6,844,707 B1 | 1/2005 | Raad | ......... | 322/29 |
| 6,949,902 B2 * | 9/2005 | Nakayama et al. | ......... | 318/432 |
| 6,965,173 B2 * | 11/2005 | Fukasaku et al. | ......... | 290/40 C |
| 2001/0019210 A1 * | 9/2001 | Fukasaku et al. | ......... | 290/40 C |
| 2002/0005699 A1 | 1/2002 | Koenen et al. | ......... | 318/254 |
| 2003/0015875 A1 * | 1/2003 | Fukaya | ......... | 290/40 C |
| 2005/0162030 A1 | 7/2005 | Shah et al. | ......... | 310/165 |
| 2006/0231304 A1 * | 10/2006 | Severinsky et al. | ......... | 180/65.2 |
| 2006/0231305 A1 * | 10/2006 | Severinsky et al. | ......... | 180/65.2 |
| 2006/0231306 A1 * | 10/2006 | Severinsky et al. | ......... | 180/65.2 |
| 2006/0237246 A1 * | 10/2006 | Severinsky et al. | ......... | 180/65.2 |

* cited by examiner

SYSTEM AND METHOD FOR PROPELLING A LARGE LAND-BASED VEHICLE USING A DUAL FUNCTION BRUSHLESS DYNAMOELECTRIC MACHINE

FIELD OF THE INVENTION

The present invention is generally related to electrical propulsion systems, and more particularly, to a system and techniques for propelling a relatively large land-based vehicle, such as a locomotive or an off-highway vehicle, with a brushless dynamoelectric machine that provides dual functionality, i.e., as a traction alternator, or as a cranking motor for an internal combustion engine of the propulsion system.

BACKGROUND OF THE INVENTION

It is known that dynamoelectric machines that may be used to provide dual functionality, (e.g., as a traction alternator, or as a cranking motor) in a propulsion system of a relatively large land-based vehicle, such as a locomotive or off-highway vehicle, often require connecting an excitation current to a rotating winding to induce a rotating electromagnetic field. This excitation current may be supplied to the rotating winding through one or more slip rings or brushes. The use of brushes or slip rings to connect the excitation current may entail burdensome and costly maintenance, such as may be needed to replace the brushes that wear out due to the frictional engagement that occurs at the slip rings. Moreover, the need of brushes or slip rings incrementally adds to the weight and volume of the propulsion system and could detrimentally affect the operational reliability of the system.

Although brushless dynamoelectric machines are well known in the art, such brushless machine may not have fully accommodated in a cost-effective and uncomplicated manner the various operational needs that may be required by dynamoelectric machines that are operable to provide dual functionality, e.g., as a traction alternator, or as a cranking motor, in a locomotive propulsion system.

Accordingly, it is desirable to provide a cost-effective and straight-forward propulsion system that allows operating the dynamoelectric machine as a brushless machine that provides dual functionality, i.e., as a traction alternator, or as a cranking motor for the engine. It is further desirable to eliminate costly and burdensome maintenance as generally required by a dynamoelectric machine that employs brushes and slip rings. It is also desirable to provide a brushless dynamoelectric machine that incrementally contributes to the overall reliability of the propulsion system and leads to reductions in the size and weight of the propulsion system.

BRIEF DESCRIPTION OF THE DRAWINGS

These and other advantages of the invention will be more apparent from the following description in view of the drawings that show.

DETAILED DESCRIPTION OF THE INVENTION

Figure 1:
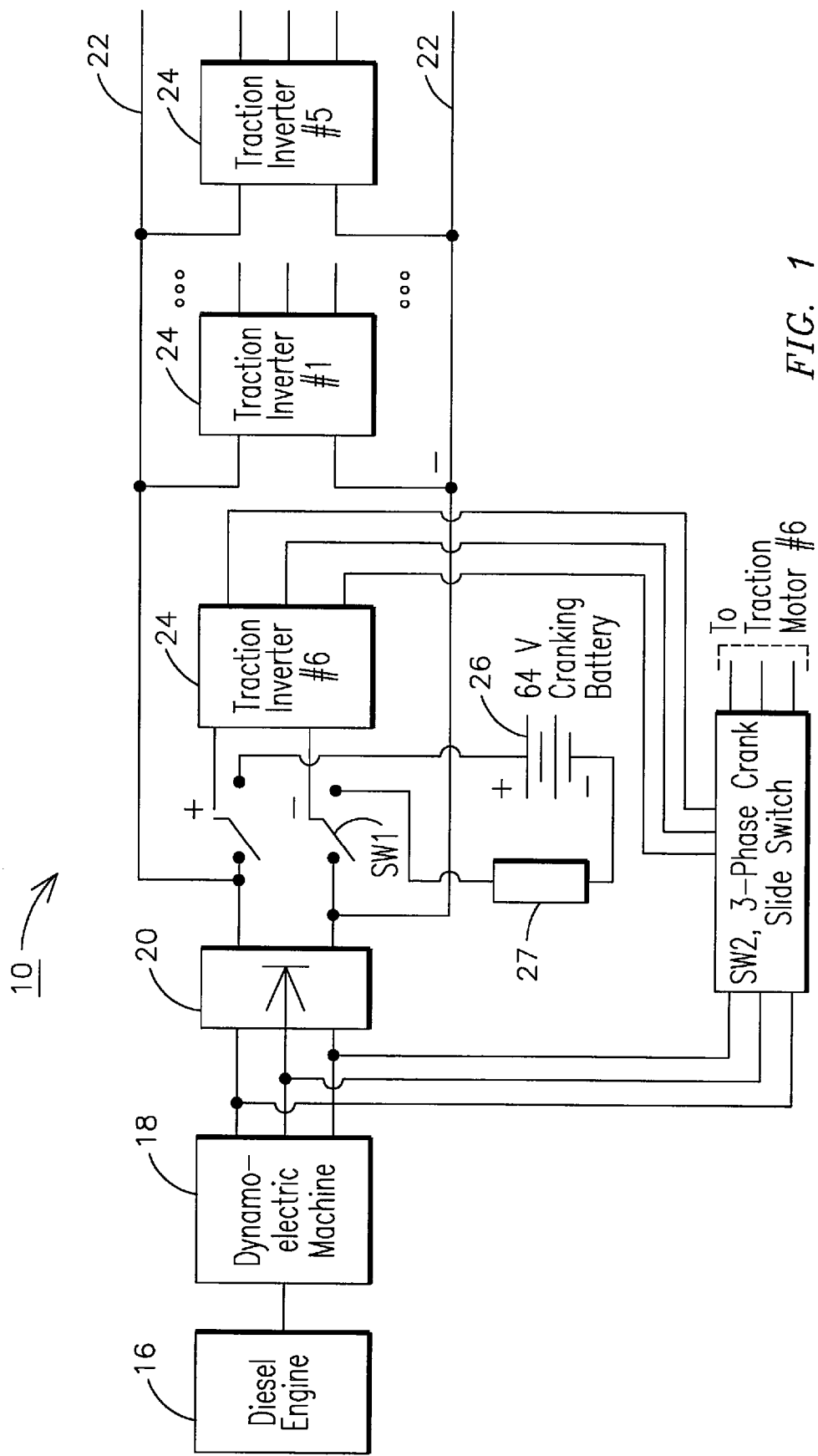
FIG. 1 illustrates a block diagram representation of one example embodiment of a propulsion system that may benefit from aspects of the present invention.

FIG. 1 illustrates one example embodiment of a propulsion system 10 that may benefit from aspects of the present invention. Propulsion system 10 may be used in a relatively large land-based vehicle, such as a locomotive or an off-highway vehicle, wherein an internal combustion engine or prime mover 16, such as a diesel engine, is mechanically coupled to a dynamoelectric machine 18 that may be operated as a traction alternator, or as a cranking starter motor for the engine. In view of the dual functionality of dynamoelectric machine 18, this component may be referred to as an alternator or as a motor.

A rectifier 20 provides suitable rectification to the alternating current (AC) output from alternator 18 to power up a direct current (DC) power bus 22 having respective DC rails each carrying a voltage of opposite polarity with respect to one another. A plurality of traction inverters 24, which in turn drive one or more of a plurality of traction motors (not shown), receives power through power bus 22.

In one aspect of the propulsion system of FIG. 1, a cranking operation for engine 16 may be provided by using either a separate cranking inverter, or by electrically switching one of the traction inverters 24 (e.g., the traction inverter labeled as traction inverter #6) during the cranking operation. In the example configuration shown in FIG. 1, a switch SW1 (e.g., a two-pole-double-throw switch) may be used to connect a power storage unit 26 for storing electrical power (e.g., a battery). The storage unit may be rated to provide a relatively low voltage (e.g., a 64 V nominal battery voltage) to the DC input of the traction inverter, and a switch SW2 (e.g., 3-phase slide switch) may be used to connect the traction inverter three phase output to the leads that would normally provide the alternator 3-phase output to the main rectifier (but in this case receive a 3-phase input signal), to operate alternator 18 as a cranking motor for the diesel engine, while in the engine cranking mode of operation.

In one example embodiment, with an alternator field winding 27 in the load current path during engine cranking, dynamoelectric machine 18 will operate with characteristics similar to that of a DC series motor. That is, relatively high starting current and hence desirably high starting torque at low speeds. For readers who desire additional background information regarding examples of locomotive cranking systems, reference is made to U.S. Pat. Nos. 4,616,166 (Electric Power System for Starting a Large Rotatable Synchronous Machine, and 6,023,137 (Use of Traction Inverter for Supplying Power for Non-traction Applications), each assigned in common to the same assignee of the present invention and herein incorporated by reference.

The inventor of the present invention has recognized an innovative combination of components in a propulsion system that allows operating the dynamoelectric machine 18 as a brushless machine that provides dual functionality, i.e., as a traction alternator, or as a cranking motor for the engine. The proposed combination is believed to be advantageous since it should result in eliminating costly and burdensome maintenance as generally required by a dynamoelectric machine that employs brushes and slip rings. Moreover, a brushless dynamoelectric machine should incrementally contribute to the overall reliability of the propulsion system and should lead to reductions in the size and weight of the propulsion system.

Figure 2:
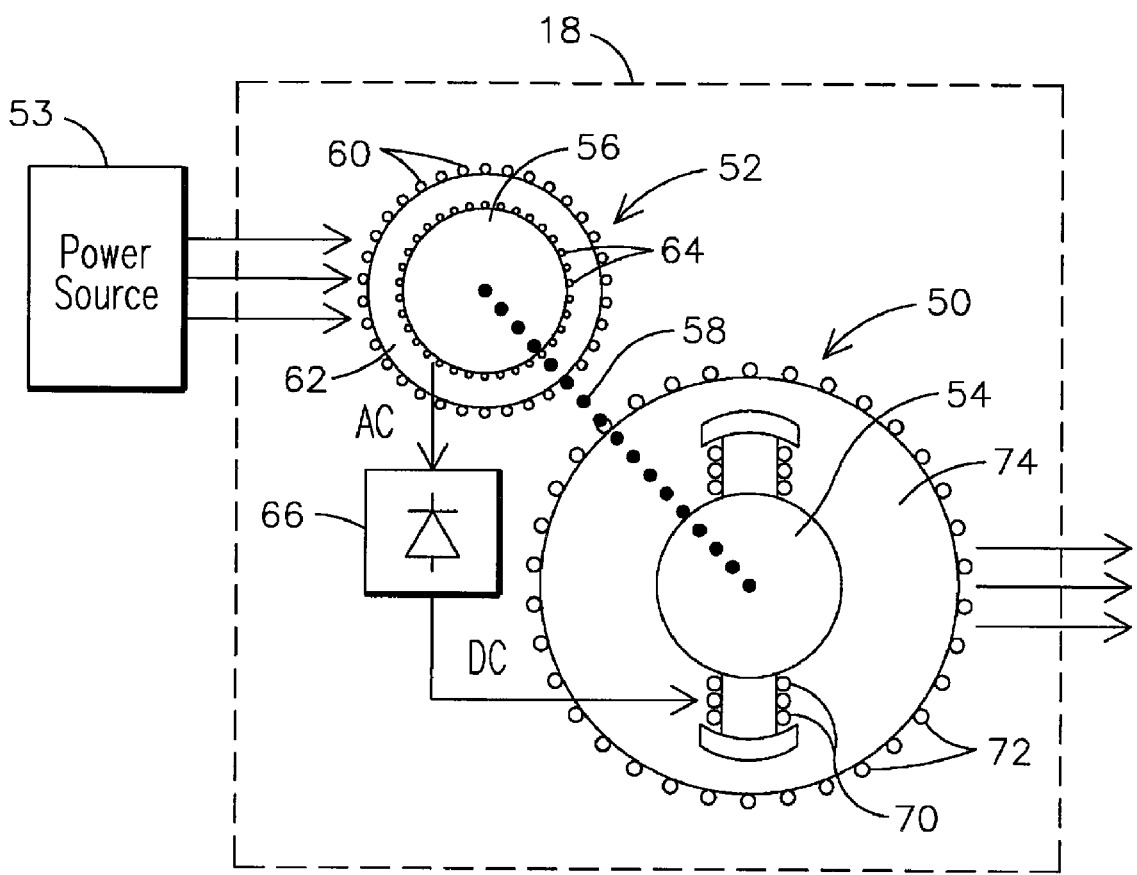
FIG. 2 illustrates a schematic representation of a brushless dynamoelectric machine as may be connected in a propulsion system in accordance with aspects of the present invention for electric power generation.

As shown in FIG. 2, in accordance with aspects of the present invention, alternator 18 is arranged as a brushless dynamoelectric machine that comprises a first (e.g., a main) alternator 50 and a second (e.g., auxiliary) alternator 52, operatively connected to function as an exciter to main alternator 50. FIG. 2 will be used to describe an electric power generating mode of alternator 18 and FIG. 3 will be used to describe a cranking mode of alternator 18.

Referring to FIG. 2, the main alternator 50 includes a main rotor 54, and the auxiliary alternator 52 includes an auxiliary rotor 56. Rotors 54 and 56 are each mounted on a rotatable shaft 58 mechanically connected to the crankshaft of engine 16 (FIG. 1). In auxiliary alternator 52, a suitable current source 53, such as a DC current source, or a variable-frequency current source, so long as the signal frequency is different than the rotational frequency of the rotating windings, provides current that flows through the stationary windings 60 of auxiliary stator 62 and generates an electromagnetic field that induces an AC flow in the rotating windings 64 on the auxiliary rotor 56.

The AC flow induced in windings 64 is rectified by a rectifier 66 that is arranged to rotate with the rotatable shaft 58 and the rectified current from rectifier 66 is connected to field windings 70 on main rotor 54 of main generator 50, which in the generating mode in turn induces the main alternating current generated by the windings 72 of main stator 74. As described in the context of FIG. 1, rectifier 20 provides suitable rectification to the main alternating current output from alternator 18 to power up the DC power bus 22.

Since the windings 64 in the auxiliary rotor 56 are connected to jointly rotate with the field windings 70 of the main alternator, this advantageously eliminates the need for brushes and slip rings for transmitting the excitation current to the field windings. In operation, alternator 18 generates alternating voltages at the line terminals of its main stator windings. As will be appreciated by those skilled in the art, the rms magnitude of the fundamental sinusoidal components of these voltages depends on the angular velocity (rpm) of the rotatable shaft and on the amount of field excitation, which in turn depends on the excitation produced by the auxiliary stator 62.

Figure 3:
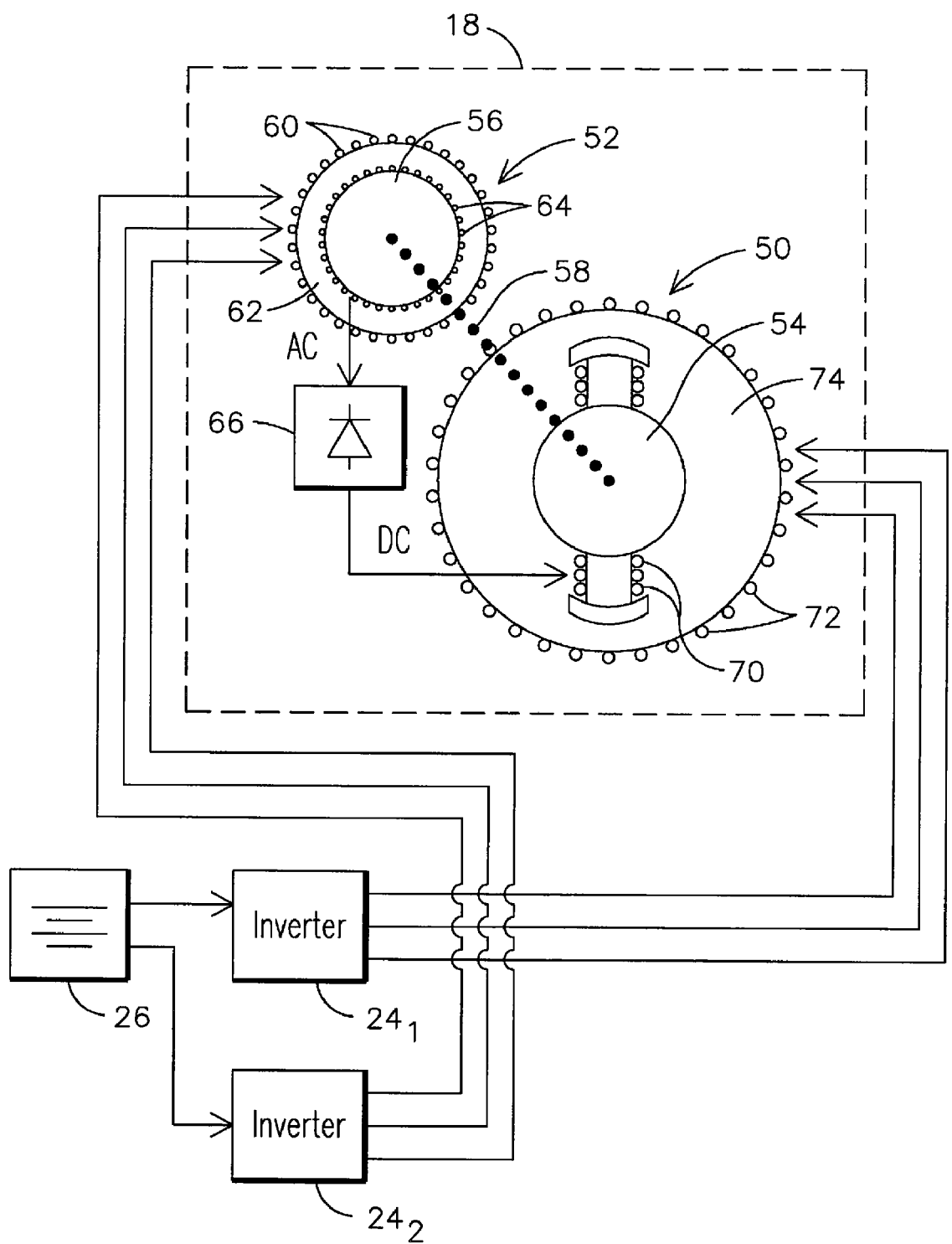
FIG. 3 illustrates a schematic representation of the brushless dynamoelectric machine of FIG. 2 as may be connected in a propulsion system in accordance with further aspects of the present invention for cranking an engine.

Referring to FIG. 3, in a cranking mode of operation, rotatable shaft 58 of brushless machine 18 mechanically drives the crankshaft of engine 16. Electrical energy is supplied from battery 26 through a power source, such as a first inverter $24_1$ (e.g., one of the traction inverters in FIG. 1) to provide AC conversion to the DC input from the battery to the windings 72 on the main stator of the machine 18. The signal applied to the windings 72 by inverter $24_1$ may be configured to have a desired set of characteristics, such as a signal varying in frequency in a manner proportional to engine speed, as the engine speed is ramped up during cranking.

For the main rotor 54 to generate a sufficient level of torque to rotate the crankshaft and thereby crank the engine, requires field excitation current flowing in winding 70. This excitation current may be provided in one example embodiment by applying a three phase signal to winding 60 from a suitable power source. For example, this power source may be a second three phase inverter $24_2$, such as another one of the traction inverters in FIG. 1. Inverter $24_2$ may be configured to produce three phase voltages during this mode of operation and may convert to function as a chopper (i.e., dc/dc converter) during a traction motoring mode of operation. It will be appreciated that the use of first and second inverters during the cranking mode of operation should not be construed in a limiting sense, since, as will be appreciated by those skilled in the art, other type of devices may be used as power sources, e.g., cycloconverters, auxiliary power units (APUs), etc.

It is noted that since the rotor may be stationary and/or may be at a relatively low voltage during the initial conditions of the cranking mode, a dc voltage applied to winding 60 will generally not induce enough voltage in winding 64 to produce the required excitation current in winding 70. A relatively high frequency (e.g., 60 Hz) signal impressed on winding 60 produces a rotating magnetic field which in turn induces an AC flow in winding 64 (as will be appreciated by one skilled in the art, the value of the frequency should be chosen to maintain a separation in frequency between the excitation frequency of winding 60 and the shaft speed). This induced AC flow is rectified by the rectifier 66 and produces a current in the main alternator field 70. Since there is flux produced by this field current in combination with the armature current produced in response to the signal applied by the first traction inverter, the net effect is that the main alternator becomes sufficiently energized to produce a sufficient amount of torque to rotate the engine.

As the rotor accelerates from rest, both the frequency and the rms magnitude of the fundamental alternating voltage waveforms developed at the line terminals of the main stator windings (i.e., the back emf) correspondingly increase. Accordingly, the second traction inverter may be configured to apply a signal with a different set of characteristics than the characteristics of the signal applied by the first inverter. For example, this may involve controlling the frequency and/or the magnitude of the applied signal to supply enough power to the alternator. For example, a voltage magnitude and/or frequency applied to the winding 60 may be controlled to produce a desired level of excitation current in winding 70. Once the rotor reaches a predetermined rotor speed, such as 240 rpm, the engine is considered to be started and the motoring mode (i.e., engine cranking mode) of operation is discontinued. In an example case, where machine 18 has ten poles, 240 rpm corresponds to a fundamental frequency of 20 Hertz. Accordingly, in this example the fundamental frequency of the alternating current signal supplied by the first inverter to the stator windings of machine 18 should be ramped up from zero to approximately 20 Hertz in order for the illustrated system to perform its engine cranking function.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A propulsion system for a relatively large land-based vehicle, the system comprising:
   a brushless dynamoelectric machine comprising a main alternator having a main rotor and a main stator, and an auxiliary alternator having an auxiliary rotor and an auxiliary stator, wherein the main rotor and the auxiliary rotor are disposed on a shaft for joint rotation with the shaft, wherein said dynamoelectric machine is operable in a power generating mode, and in an engine cranking mode;
   a power source connected to at least pass current to one or more windings in the auxiliary stator to induce an alternating current flow in one or more windings in the auxiliary rotor; and a rectifier connected to receive the alternating current flow from the one or more windings in the auxiliary rotor, the rectifier further connected to supply a rectified current to one or more windings in the main rotor to induce an alternating current flow in one or more windings in the main stator of the machine, wherein the alternating current flow in the one or more windings in the main stator of the machine constitutes the current generated by said dynamoelectric machine during the power generating mode, wherein the power source during the engine cranking mode comprises a first power source connected to supply a first alternating current signal having a first set of characteristics, wherein the alternating signal from the first power source is connected to the one or more windings in the main stator, the power source during the engine cranking mode further comprising a second power source connected to supply a second alternating current signal having a second set of characteristics different than the set of characteristics of the first alternating signal, wherein the alternating current signal from the second power source is connected to the one or more windings in the auxiliary stator, a combined effect of the alternating current signals from the first and second power sources configured to produce a torque in the main rotor of the machine, wherein the torque being produced at the main rotor of the machine is mechanically coupled to a crankshaft of an internal combustion engine of the propulsion system to start the engine during the engine cranking mode.

2. The propulsion system of claim 1 wherein the power source when connected during the power generating mode to the one or more windings in the auxiliary stator is a power source selected from the group consisting of a DC power source, and a variable frequency power source.

3. The propulsion system of claim 1 wherein the relatively large land-based vehicle comprises a locomotive.

4. The propulsion system of claim 1 wherein the relatively large land-based vehicle comprises an off-highway vehicle.

5. The propulsion system of claim 1 wherein the set of characteristics of the alternating current signal from the first power source comprises a signal frequency that varies proportional to engine speed.

6. The propulsion system of claim 1 wherein the set of characteristics of the alternating current signal from the second power source comprises a signal having a magnitude and/or a frequency selected to obtain a desired level of current flow in the one or more windings in the auxiliary rotor.

7. A relatively large land-based vehicle, comprising:
a propulsion system comprising:
an internal combustion engine;
a brushless dynamoelectric machine mechanically coupled to the internal combustion engine, the brushless dynamoelectric machine comprising a main alternator having a main rotor and a main stator, and an auxiliary alternator having an auxiliary rotor and an auxiliary stator, wherein the main rotor and the auxiliary rotor are disposed on a shaft for joint rotation with the shaft, wherein said dynamoelectric machine is operable in a power generating mode, and in an engine cranking mode;
a power source connected to pass current to one or more windings in the auxiliary stator to induce an alternating current flow in one or more windings in the auxiliary rotor; and a rectifier connected to receive the alternating current flow from the one or more windings in the auxiliary rotor, the rectifier further connected to supply a rectified current to one or more windings in the main rotor to induce an alternating current flow in one or more windings in the main stator of the machine, wherein the alternating current flow in the one or more windings in the main stator of the machine constitutes the current generated by said dynamoelectric machine during the power generating mode, wherein the power source during the engine cranking mode comprises a first power source connected to supply a first alternating current signal having a first set of characteristics, wherein the alternating signal from the first power source is connected to the one or more windings in the main stator, the power source during the engine cranking mode further comprising a second power source connected to supply an alternating current signal having a second set of characteristics different than the first set of characteristics, wherein the alternating current signal from the second power source is connected to the one or more windings in the auxiliary stator, a combined effect of the alternating current signals from the first and second power sources configured to produce a torque in the main rotor of the machine, wherein the torque being produced at the main rotor of the machine is mechanically coupled to a crankshaft of an internal combustion engine of the propulsion system to start the engine during the engine cranking mode.

8. The vehicle of claim 7 wherein the power source when connected during the power generating mode to the one or more windings in the auxiliary stator is a power source selected from the group consisting of a DC power source, and a variable frequency power source.

9. The vehicle of claim 7 wherein the vehicle is selected from the group consisting of a locomotive and an off-highway vehicle.

10. The vehicle of claim 7 wherein the set of characteristics of the alternating current signal from the first power source comprises a signal frequency that varies proportional to engine speed.

11. The vehicle of claim 7 wherein the set of characteristics of the alternating current signal from the second power source comprises a signal having a magnitude and/or a frequency selected to obtain a desired level of current flow in the one or more windings in the auxiliary rotor.

12. A method for propelling a relatively large land-based vehicle, the method comprising:
operating a brushless dynamoelectric machine comprising a main alternator having a main rotor and a main stator, and an auxiliary alternator having an auxiliary rotor and an auxiliary stator, wherein the main rotor and the auxiliary rotor are disposed on a shaft for joint rotation with the shaft, wherein the operating of said dynamoelectric machine comprises operating in a power generating mode, and in an engine cranking mode;
connecting a power source to at least pass current to one or more windings in the auxiliary stator to induce an alternating current flow in one or more windings in the auxiliary rotor;
rectifying the alternating current flow from the one or more windings in the auxiliary rotor to provide a rectified current; connecting the rectified current to one or more windings in the main rotor to induce an alternating current flow in one or more windings in the main stator of the machine, wherein the alternating current flow in the one or more windings in the main stator of the machine constitutes the current generated by said dynamoelectric machine during the power generating mode;

during the engine cranking mode, connecting a first power source to supply an alternating current signal having a first set of characteristics;

connecting the alternating current signal from the first power source to the one or more windings in the main stator;

during the engine cranking mode, connecting a second power source to supply an alternating current signal having a second set of characteristics different than the first set of characteristics, wherein the first and second power sources constitute the power source during the engine cranking mode;

connecting the alternating current signal from the second power source to the one or more windings in the auxiliary winding; and mechanically coupling a torque, being produced at the main rotor of the machine in response to a combined effect of the alternating current signals from the first and second power sources, to a crankshaft of an internal combustion engine of the propulsion system to start the engine during the engine cranking mode.

13. The propulsion system of claim 1 wherein the first power source comprises a first inverter connected to provide an AC conversion to a DC input from an energy storage device to supply the first alternating current signal having the first set of characteristics.

14. The propulsion system of claim 13 wherein the second power source comprises a second inverter connected to provide an AC conversion to a DC input from the energy storage device to supply the second alternating current signal having the second set of characteristics.

15. The vehicle of claim 7 wherein the first power source comprises a first inverter connected to provide an AC conversion to a DC input from an energy storage device to supply the first alternating current signal having the first set of characteristics.

16. The vehicle of claim 7 wherein the second power source comprises a second inverter connected to provide an AC conversion to a DC input from an energy storage device to supply the second alternating current signal having the second set of characteristics.

17. The method of claim 12 wherein the step of connecting the first power source during the engine cranking mode comprises connecting a first inverter to provide an AC conversion to a DC input from an energy storage device to supply the first alternating current signal having the first set of characteristics.

18. The method of claim 17 wherein the step of connecting the second power source during the engine cranking mode comprises connecting a second inverter to provide an AC conversion to a DC input from the energy storage device to supply the second alternating current signal having the second set of characteristics.

* * * * *